(12) United States Patent
Lim (10) Patent No.: US 10,237,297 B2
(45) Date of Patent: Mar. 19, 2019

(54) SYSTEM AND METHOD FOR THREAT INCIDENT CORROBORATION IN DISCRETE TEMPORAL REFERENCE USING 3D DYNAMIC RENDERING

(71) Applicant: Certis CISCO Security Pte Ltd, Singapore (SG)

(72) Inventor: Keng Leng Albert Lim, Singapore (SG)

(73) Assignee: Certis Cisco Security Pte Ltd, Singapore (SG)

( * ) Notice: Subject to any disclaimer, the term of this patent is extended or adjusted under 35 U.S.C. 154(b) by 341 days.

(21) Appl. No.: 15/117,151

(22) PCT Filed: Apr. 11, 2016

(86) PCT No.: PCT/SG2016/050175
§ 371 (c)(1),
(2) Date: Aug. 5, 2016

(87) PCT Pub. No.: WO2017/180057
PCT Pub. Date: Oct. 19, 2017

(65) Prior Publication Data
US 2018/0324202 A1 Nov. 8, 2018

(51) Int. Cl.
*G06F 21/00* (2013.01)
*H04L 29/06* (2006.01)
(Continued)

(52) U.S. Cl.
CPC ...... *H04L 63/1433* (2013.01); *G06F 3/04842* (2013.01); *G06F 3/04883* (2013.01);
(Continued)

(58) Field of Classification Search
CPC .......... H04L 63/1433; H04L 43/045; H04L 63/1416; H04L 63/1441; G06F 3/04842; G06F 3/04883; G06K 9/6218
See application file for complete search history.

(56) References Cited

U.S. PATENT DOCUMENTS

| 5,287,121 A * | 2/1994 | Louis | G06F 3/03547 178/18.01 |
| 6,906,709 B1 * | 6/2005 | Larkin | H04L 63/1433 345/419 |

(Continued)

FOREIGN PATENT DOCUMENTS

WO 2015127472 A2 8/2015

OTHER PUBLICATIONS

International Search Report International Application No. PCT/SG2016/050175, Search completed Aug. 2, 2016, dated Aug. 2, 2016, 6 Pgs.

*Primary Examiner* — Lisa C Lewis
(74) *Attorney, Agent, or Firm* — Klein, O'Neil & Singh, LLP (57) ABSTRACT

A system and method for evaluating cyber-security threat incidents of a computer network is described in this document. In particular, it is described that cyber-security threat incidents of a computer network may be visualized by displaying these threat incidents as a plurality of graphical objects on a display of a device. A subset of these graphical objects or threat incidents may then be selected by applying a single continuous touch input to a touch interface of the device. A risk score will then be generated and displayed based on the threat incidents that are contained within the subset of graphical objects. Mitigation actions addressing the cyber-security threats that triggered these threat incidents are then implemented by the device.

14 Claims, 8 Drawing Sheets

(51) Int. Cl.
*G06F 21/55* (2013.01)
*G06F 3/0484* (2013.01)
*G06F 3/0488* (2013.01)
*G06K 9/62* (2006.01)
*H04L 12/26* (2006.01)

(52) U.S. Cl.
CPC ......... *G06F 21/554* (2013.01); *G06K 9/6218* (2013.01); *H04L 43/045* (2013.01); *H04L 63/1416* (2013.01); *H04L 63/1441* (2013.01)

(56) References Cited

U.S. PATENT DOCUMENTS

| | | | |
|---|---|---|---|
| 2002/0056009 A1* | 5/2002 | Afifi | G06F 9/451 709/246 |
| 2008/0204427 A1* | 8/2008 | Heesemans | G06F 3/0414 345/174 |
| 2009/0216383 A1* | 8/2009 | Klinger | B60H 1/00985 700/278 |
| 2009/0254970 A1* | 10/2009 | Agarwal | G06F 21/554 726/1 |
| 2010/0100964 A1* | 4/2010 | Mahaffey | G06F 21/554 726/25 |
| 2013/0055387 A1* | 2/2013 | Kim | G06F 21/55 726/22 |
| 2013/0241865 A1* | 9/2013 | Lin | G06F 3/0416 345/174 |
| 2013/0247205 A1* | 9/2013 | Schrecker | G06F 21/577 726/25 |
| 2014/0137257 A1* | 5/2014 | Martinez | H04L 63/1433 726/25 |
| 2014/0173739 A1* | 6/2014 | Ahuja | G06F 21/577 726/25 |
| 2014/0298273 A1* | 10/2014 | Blackstone | G06F 3/017 715/863 |
| 2015/0052465 A1* | 2/2015 | Altin | G06F 3/04842 715/769 |
| 2015/0261833 A1* | 9/2015 | Blaas | G06F 17/30241 707/722 |
| 2016/0072836 A1* | 3/2016 | Hadden | H04L 63/1441 726/23 |
| 2017/0063899 A1* | 3/2017 | Muddu | H04L 63/1425 |
| 2017/0126740 A1* | 5/2017 | Bejarano Ardila | H04L 63/20 |
| 2017/0357346 A1* | 12/2017 | Wang | G06F 3/044 |

* cited by examiner

SYSTEM AND METHOD FOR THREAT INCIDENT CORROBORATION IN DISCRETE TEMPORAL REFERENCE USING 3D DYNAMIC RENDERING

FIELD OF THE INVENTION

This invention relates to a system and method for evaluating cyber-security threat incidents of a computer network. In particular, the invention involves visualizing cyber-security threat incidents of a computer network by displaying these threat incidents as a plurality of graphical objects on a display of a device. A subset of these graphical objects representing threat incidents in variant temporal reference frame may then be selected by applying a single continuous touch input to a touch interface of the device. A risk score will then be generated and displayed based on the threat incidents that are contained within the subset of graphical objects. Mitigation actions addressing the cyber-security threats that triggered these threat incidents are then implemented by the device.

SUMMARY OF PRIOR ART

Increasingly, greater numbers of computer security systems are being deployed to monitor security events that occur in the daily operations of organizations' computer networks. The main aim of such monitoring activities is to detect and mitigate anomalous events, such as attacks on or breaches of the network's security, before the anomalous events are able to wreak havoc on the computer networks.

A monitoring system that is usually utilized for such purposes is a security event monitoring system. Such an event monitoring system may be used as a centralized hub to receive and collate security events transmitted from the computer network's many monitoring devices. Each time a monitoring device detects an anomalous event, the monitoring device will transmit a security event to the computer network's event monitoring system. As the computer network will utilize a wide variety of monitoring devices, e.g. firewalls, intrusion detection systems, etc., the event monitoring system will typically receive security events in various formats and styles. To address this mishmash of information, the event monitoring system will collate and convert the received security events into a uniformed format referred to as transportable incident format (TIF). Storing these security events in such a uniformed format enables the standardization of reports, trend analysis and vulnerability analysis of the recorded incidents.

The collated TIF records may then be easily assessed by security analysts to determine an appropriate mitigation action that is to be executed to attend to the security event. The mitigation action may be based on pre-planned actions that are provided within a rule set or alternatively, if pre-planned actions are not available, the security event may be escalated for further analysis by human analysts.

Rows and rows of TIF records that are to be evaluated by the security analysts are rapidly generated in real-time as the number of anomalous events detected increases. Conventionally, the TIF records will be displayed using a text based approach as rows or columns on a page. Each row will contain information about the attack that triggered the security event such as the attacker's source IP address, the nature of the attack, operating systems affected by the attack, etc.

An analyst will have to review each row of the TIF records to evaluate whether the incidents contained within are actual threats to the computer network. Further, as more and more rows of TIF records are generated, it becomes more difficult for an analyst to determine or visualize the relationship between one incident and the next. For example, a first incident may be related to a tenth incident detected on another monitoring device. These issues increase the possibility of errors occurring. In turn, this will result in erroneous assessments of the incidents which then results in the generation of false alerts. False alerts are detrimental to a computer network as computing resources have to be deployed or disabled to address these false alerts. In certain scenarios, malicious attackers may even exploit the generation of such false alerts to overload a computer network's resources so that the malicious attacker may breach the network's security when the network's resources have been diverted to attend to the multitude of false alerts.

For the above reasons, those skilled in the art are constantly striving to come up with a system and method that allows cyber-security threat incidents of a very large scale to be simultaneously, accurately and efficiently evaluated on a single display.

SUMMARY OF THE INVENTION

The above and other problems are solved and an advance in the art is made by systems and methods provided by embodiments in accordance with the invention. A first advantage of embodiments of systems and methods in accordance with the invention is that cyber-security threat incidents, which are represented by graphical objects on a display, may be easily and quickly evaluated in real time as risk scores of selected incidents would be instantly updated and displayed. This reduces the occurrences of false alerts and the subsequently avoidable mitigation actions, thereby freeing up computer resources.

A second advantage of embodiments of systems and methods in accordance with the invention is that the touch interface allows the graphical objects that are arranged in three-dimensional format with respect to one another to be easily selected by a user of the invention without the need for the display to be scrolled or minimized.

A third advantage of embodiments of systems and methods in accordance with the invention is that targeted mitigation actions may be rapidly executed to address specific selected incidents. Incidents that are deemed to be low risk to the computer network are left unattended while incidents that are determined to be a threat to the computer network will be attended to. This ensures that the computer network's resources may be strategically deployed.

The above advantages are provided by embodiments of a system in accordance with the invention operating in the following manner.

According to a first aspect of the invention method of evaluating cyber-security threat incidents of a computer network using a device comprises: presenting graphical objects on a user interface of a display of the device, whereby each graphical object represents a cyber-security threat incident; receiving a single continuous touch input through a touch interface of the user interface, the continuous touch input selecting a subset of graphical objects; generating a risk score for the subset of graphical objects, whereby the risk score is generated using incident scores of each graphical object in the subset of graphical objects; displaying the generated risk score on the display of the device; and executing mitigation actions for graphical objects in the subset of graphical objects if the generated risk score exceeds a confidence score.

With reference to the first aspect, in a first possible implementation of the first aspect, the generating the risk score for the subset of graphical objects comprises: retrieving a list of computer assets associated with the computer network and severity weightage values accorded to each of the computer assets, whereby for each graphical object, identifying computer assets that are affected by the threat incident represented by the graphical object and summing the severity weightage values of the identified computer assets, and dividing the summed severity weightage values by the sum of severity weightage values of all the assets to obtain the incident score for each graphical object, and calculating the risk score by dividing a sum of the incident scores of all the graphical objects in the subset of graphical objects by a total number of graphical objects in the subset of graphical objects and by multiplying the result with a 100.

With reference to the first aspect, in a second possible implementation of the first aspect, the selecting the subset of graphical objects comprises tracing, by the touch input, a continuous boundary around the graphical objects; and generating the subset of graphical objects from graphical objects encompassed by the boundary.

With reference to the first aspect, in a third possible implementation of the first aspect, the selecting the subset of graphical objects comprises tracing, by the touch input, a continuous three-dimensional pattern through graphical objects provided on a first plane and graphical objects provided on a second plane, whereby a graphical object on the first plane is selected by applying a first pressure value on the touch interface and a graphical object on the second plane is selected by applying a second pressure value on the touch interface; and generating the subset of graphical objects from graphical objects contained within the three-dimensional pattern.

With reference to the first aspect, in a fourth possible implementation of the first aspect, the selecting the subset of graphical objects comprises tracing, by the touch input, a continuous three-dimensional pattern through graphical objects provided on a first plane, graphical objects provided on a second plane and graphical objects provided on a third plane, whereby a graphical object on the first plane is selected by applying a first pressure value on the touch interface, a graphical object on the second plane is selected by applying a second pressure value on the touch interface and a graphical object on the third plane is selected by applying a third pressure value on the touch interface; and generating the subset of graphical objects from graphical objects contained within the three-dimensional pattern.

With reference to the first aspect, in a fifth possible implementation of the first aspect, the mitigation action comprises transmitting, by the device, a command to an intermediate intrusion detection or prevention system associated with the computer network to mitigate Internet Protocol addresses that triggered the cyber-security threat incidents in the subset of graphical objects and at the same time, submit an incident notification ticket to a SIEM system where possible.

With reference to the fourth or fifth possible implementation of the first aspect, in a sixth possible implementation of the first aspect, the first pressure value comprises coordinates in x and y Cartesian coordinates and the second pressure value comprises coordinates in x, y and z Cartesian coordinates.

With reference to the first aspect, in a seventh possible implementation of the first aspect, the presenting the graphical objects on a user interface of the display of the device comprises: selecting threat incidents that occurred within a time-frame; clustering the selected threat incidents into groups, wherein each group represents a time instance of the time-frame and wherein each threat incident in each group is displayed as a graphical object; and displaying each group of graphical objects as a plane along a z-axis of the user interface wherein each plane represents a time instance of the time-frame.

BRIEF DESCRIPTION OF THE DRAWINGS

The above and other problems are solved by features and advantages of a system and method in accordance with the present invention described in the detailed description and shown in the following drawings.

DETAILED DESCRIPTION

This invention relates to a system and method for evaluating whether cyber-security threat incidents affecting a computer network constitutes real threats or false alerts. In particular, the cyber-security threat incidents affecting the computer network are graphically displayed as a plurality of graphical objects configured in a two-dimensional (2D) or three-dimensional arrangement on a display of a device. In both arrangements, each graphical object connotes a threat incident. In the three-dimensional (3D) arrangement, a subset of the 3D graphical objects having multiple depth layers with each layer representing a different temporal reference frame may be selected to correlate threat incidents and this selection is done by applying a single continuous touch input to a touch interface of the device. The graphical objects in the 2D arrangement may be selected using a similar continuous touch input gesture. A risk score will then be generated and displayed based on the threat incidents that are contained within the subset of graphical objects. Mitigation actions addressing the cyber-security threats that triggered these threat incidents are then implemented by the device.

Figure 1:
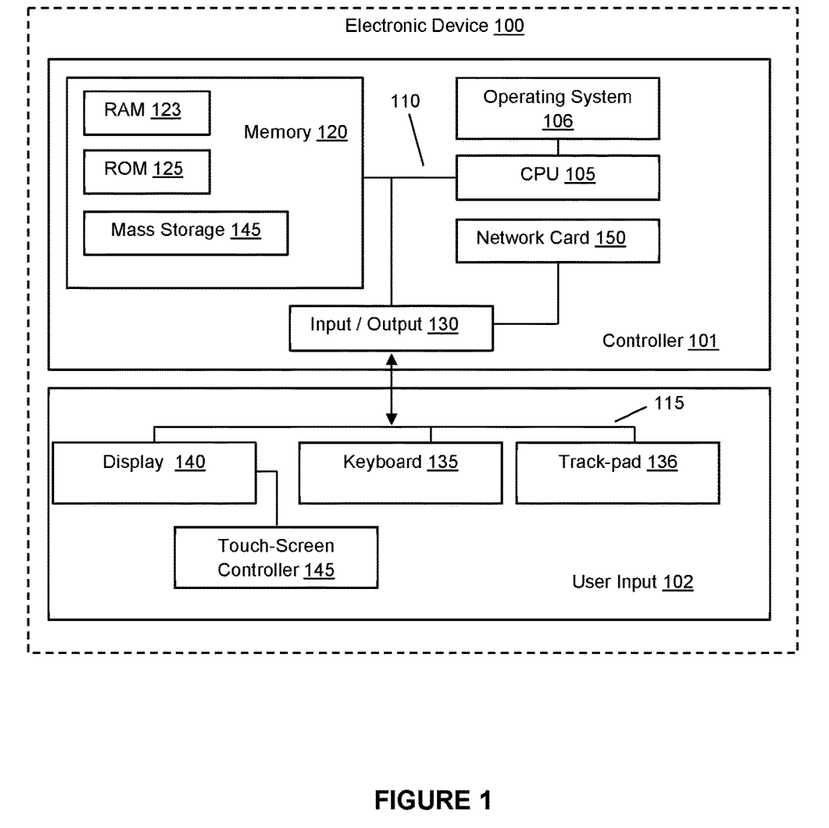
FIG. 1 illustrating a block diagram representative of components in an electronic device for implementing features in accordance with embodiments of the invention.

The block diagram in FIG. 1 illustrates a processing system and components of the processing system that may be included in electronic device 100 for implementing embodiments in accordance with embodiments of the invention. Electronic device 100 may include, but is not limited to, any device that is able to carry out computing functions and has some form of display such as a smart phone, a tablet computer, a mobile computer, a netbook, a wearable electronic device such as smart watch, and etc. One skilled in the art will recognize that the exact configuration of each electronic device may be different and the exact configuration of each electronic device may vary and FIG. 1 is given by way of example only.

In embodiments of the invention, electronic device 100 comprises controller 101 and user input 102. User input 102 is arranged to enable manual interactions between a user and electronic device 100 and for this purpose includes the input/output components required for the user to enter instructions to control electronic device 100. A person skilled in the art will recognize that components of user input 102 may vary from embodiment to embodiment but will typically include one or more of display 140, keyboard 135 and track-pad 136.

Display 140 also includes touch-screen controller 145 which is utilized to detect physical inputs on display 140. In embodiments of the invention, display 140 may comprise any type of touch screen such as resistive sensing touch screens, infrared sensing touch screens, haptic or tactile touch screens, capacitive-sensing touch screens, acoustic/piezoelectric sensing touch screens, pressure sensitive touch screens and the like. Display 140 may also include displays that detect movements on a display area using motion sensors that converts detected movements into coordinates.

In embodiments of the invention, pixels of display 140 may be defined by points of intersections between layers of electrodes (which are separated by substrates) arranged in a capacitive arrangement such that when a pressure is applied to the surface of display 140, the distance between the layers electrodes changes. When the distance between the layers of electrodes varies, this causes the capacitance measured adjacent the applied pressure to change as well. This variation in the capacitance can be detected by the resulting change in voltage at that pixel. Because of the relationship between voltage and distance between the rows of electrodes, as the distance between the electrodes is reduced, the measured voltage of the pixel will decrease accordingly. By measuring the change in the capacitance of a pixel, the location of the pixel may then be calculated by touch-screen controller 145.

The calculation of the location of a pixel may be carried out as follows. Each electrode layer may be connected to an electrical terminal provided within touch-screen controller 145 and these electrical terminals may all be arranged such that touch-screen controller 145 is able to provide a multi-terminal sensing arrangement such that a single positional value on display 140 may be determined. In particular, the multi-terminal sensing arrangement allows a measurement in Cartesian coordinates to be obtained in the X-axis, Y-axis, or Z-axis directions. The Cartesian coordinates calculated by touch-screen controller 145 are then transmitted to controller 101 for further processing.

Controller 101 is in data communication with user input 102 via bus 115 and includes memory 120, Central Processing Unit (CPU) 105 mounted on a circuit board that processes instructions and data for performing the method of this embodiment, an operating system 106, an input/output (I/O) interface 130 for communicating with user input 102 and a communications interface, in this embodiment in the form of a network card 150. Network card 150 may, for example, be utilized to send data from electronic device 100 via a wired or wireless network to other processing devices or to receive data via the wired or wireless network. Wireless networks that may be utilized by network card 150 include, but are not limited to, Wireless-Fidelity (Wi-Fi), Bluetooth, Near Field Communication (NFC), cellular networks, satellite networks, telecommunication networks, Wide Area Networks (WAN) and etc.

Memory 120 and operating system 106 are in data communication with CPU 105 via bus 110. The memory components include both volatile and non-volatile memory and more than one of each type of memory, including Random Access Memory (RAM) 120, Read Only Memory (ROM) 125 and a mass storage device 145, the last comprising one or more solid-state drives (SSDs). One skilled in the art will recognize that the memory components comprise non-transitory computer-readable media and shall be taken to comprise all computer-readable media except for a transitory, propagating signal. Typically, the instructions are stored as program code in the memory components but can also be hardwired. Memory 120 may include a kernel and/or programming modules such as a software application that may be stored in either volatile or non-volatile memory.

Herein the term "CPU" is used to refer generically to any device or component that can process such instructions and may include: a microprocessor, microcontroller, programmable logic device or other computational device. That is, CPU 105 may be provided by any suitable logic circuitry for receiving inputs, processing them in accordance with instructions stored in memory and generating outputs (for example to the memory components or on display 140). In this embodiment, CPU 105 may be a single core or multi-core processor with memory addressable space. In one example, CPU 105 may be multi-core, comprising—for example—an 8 core CPU.

Figure 2:
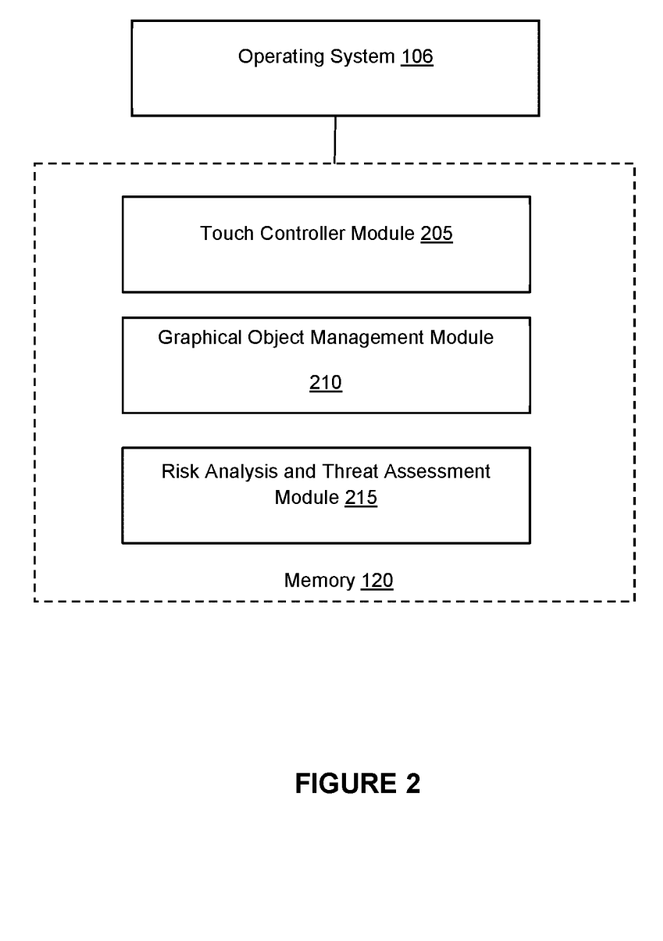
FIG. 2 illustrating a block diagram of modules in an electronic device for implementing features in accordance with embodiments of the invention.

FIG. 2 illustrates exemplary software modules 205, 210, and 215 for implementing embodiments of the invention. In embodiments of the invention, touch controller module 205, graphical object management module 210 and risk analysis and threat assessment module 215 may all be provided within memory 120. Operating system 106 acts as a controller interface controlling the flow of data between modules in user input 102 and controller 101 and may include software drivers for communicating with the various hardware or modules in electronic device 100. For example, the drivers will complement the processing of input signals received from user input 102. Such input signals may include, but are not limited to, physical data detected by display 140 that is then processed into location based data such as Cartesian coordinates by touch-screen controller 145. The location based data is then made available to touch controller module 205 through one or more application programming interfaces (APIs). These APIs can be a set of APIs that are included with operating systems (e.g., Linux or UNIX APIs), as well as APIs specific for sending and receiving data relevant to touch input. Touch controller module 205 receives the location based data and then converts the received data into input events according to an internal model. Based on the type of input events, the relevant data may then be provided to graphical object management module 210 or risk analysis and threat assessment module 215 to be further processed as described in the following sections with regard to FIGS. 3-6.

As mentioned in the earlier section, an event monitoring system is usually utilized as a centralized hub to receive and collate security events transmitted from monitoring devices in a monitored computer network. Each time a monitoring device detects an anomalous event, the monitoring device will transmit a security event to the computer network's event monitoring system. Each received security event will then be converted by the event monitoring system into a record in the transportable incident format (TIF).

Each of these incidents may comprise an incident such as, but is not limited to, a user to root attack such as: "rootkit", "loadmodule", or "Perl"; a remote to local attack such as "warezclient", "warezmaster", "imap", "ftpwrite", "multihop", "phf" or "spy"; a denial of service attack such as "ping of death", "back", "mail bomb", "UDP storm", "xlock", "xnsnoop", or "sendmail dictionary"; or a probe attack such as "saint", "portsweep", "mscan" or "nmap", just to name a few. Each incident record would contain attributes of the event such as the source IP that triggered the event, the source IP of the event, category, data, protocol, destination port, description, and the incident's timestamp which sets out the time the incident occurred together with the duration of the incident and so on.

Figure 3:
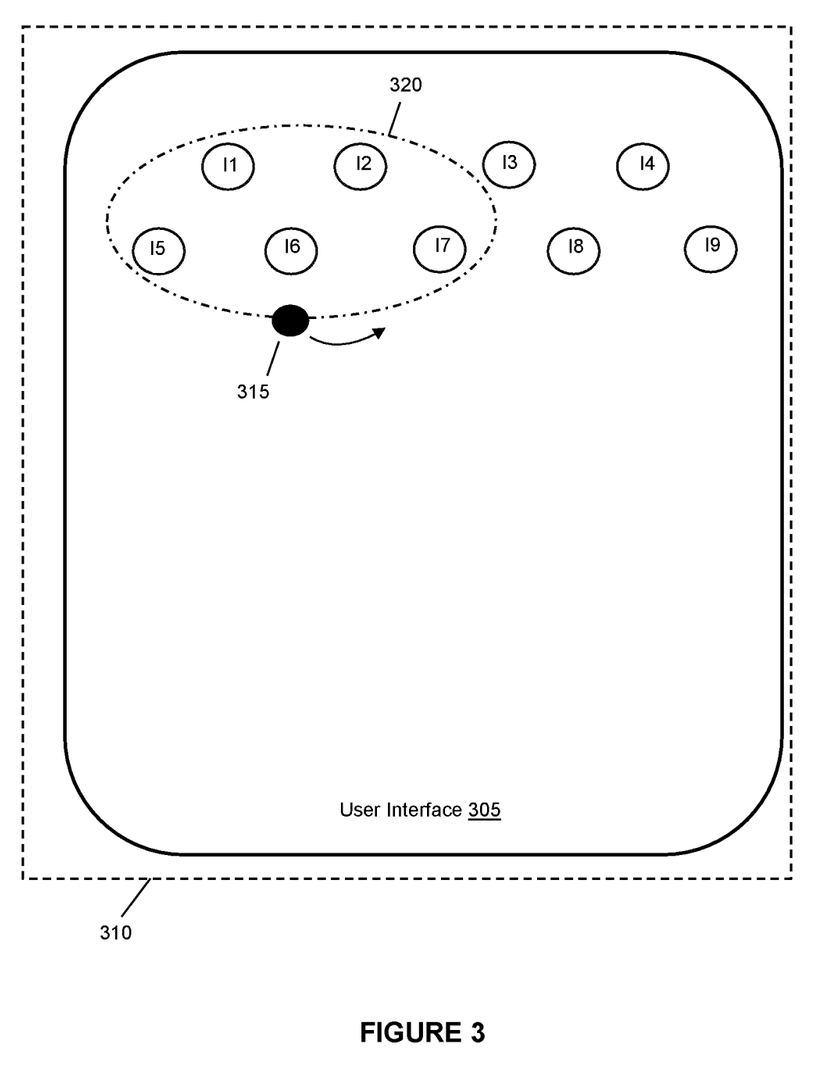
FIG. 3 illustrating an exemplary device displaying a user interface in accordance with embodiments of the invention whereby the user interface is displaying graphical objects that each represents a threat incident.

In embodiments of the invention, each incident from an event monitoring system's TIF records may be displayed as a graphical object on a display's user interface. Such an embodiment is illustrated in FIG. 3 whereby an exemplary electronic device is illustrated as having touch screen display 310. Touch screen display 310 is further provided with user interface 305. Graphical objects I1-I9 are displayed on user interface 305 whereby each graphical object represents a unique incident from the monitoring system's TIF records. One skilled in the art will recognize that although FIG. 3 only illustrates nine graphical objects that represent nine incidents, any number of graphical objects may be displayed on user interface 305 without departing from this invention.

Figure 5A:
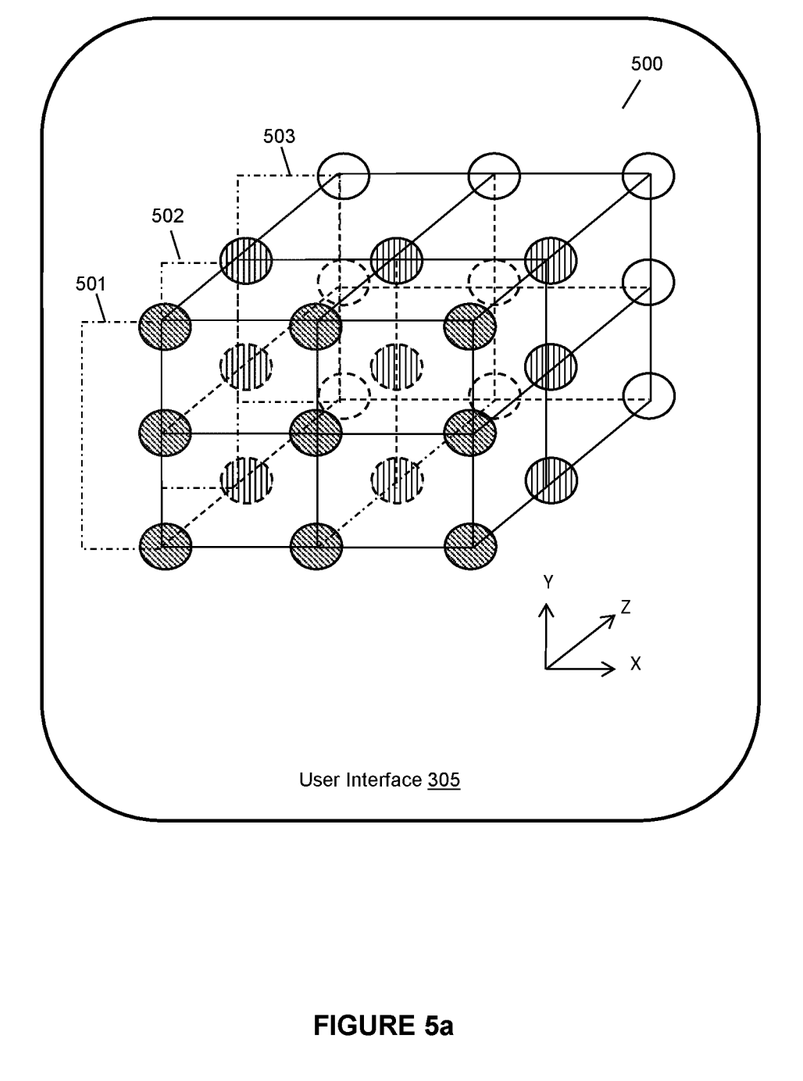
FIG. 5a illustrating an exemplary device displaying a user interface in accordance with embodiments of the invention whereby the user interface is displaying graphical objects in a three-dimensional arrangement on the display.

User interface 305 allows a user of the device to interact with graphical objects displayed on display 310 by applying various touch inputs, e.g. by moving a finger or any pressure applying tool, across the surface of touch screen display 310. Graphical objects on user interface 305 may be arranged in a two-dimensional arrangement (as illustrated in FIG. 3) or if a large number of graphical objects is to be displayed, user interface 305 will cause these graphical objects to be displayed in a three-dimensional arrangement instead (as illustrated in FIG. 5a).

At a first instance in time, a user may apply a pressure (using a finger or a pointer) onto user interface 305 to selectively draw a continuous boundary around certain graphical objects displayed on user interface 305 to indicate that these graphical objects are to be selected. In the example shown in FIG. 3, a pressure is applied at point 315 and this pressure is continuously applied in a single motion to trace circle 320 around graphical objects I1, I2, I5, I6 and I7. A dotted line or some form of visual indicator may be displayed on display 310 to visually indicate to the user that graphical objects I1, I2, I5, I6 and I7 are to be selected as part of a subset of graphical objects encompassed by circle 320.

Figure 4:
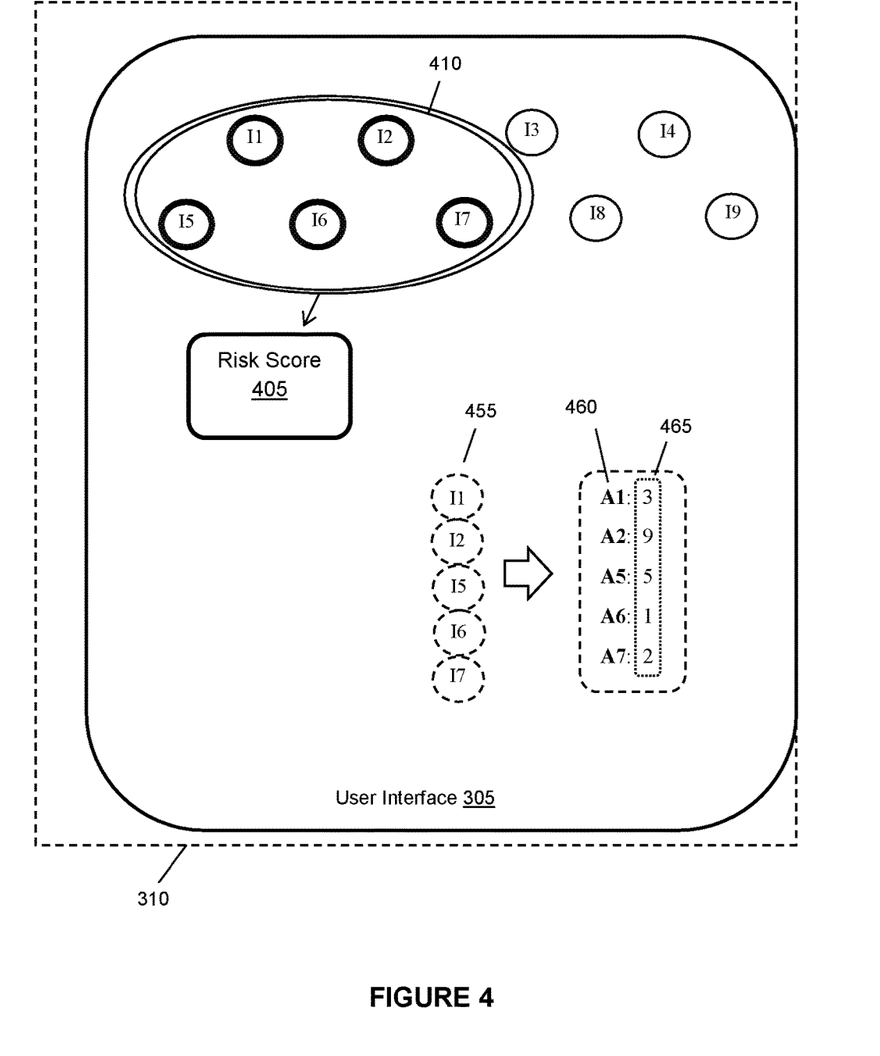
FIG. 4 illustrating an exemplary device displaying a user interface in accordance with embodiments of the invention whereby a subset of graphical objects have been selected using a continuous touch input and a risk score has been generated and displayed for the selected subset of graphical objects.

At a next instance in time, after the user has stopped applying the pressure to user interface 305, circle 320 will be transformed into three-dimensional object 410 encompassing graphical objects bounded by the continuous boundary. In the illustrated example, this results in object 410 encompassing graphical objects I1, I2, I5, I6 and I7. When this occurs, graphical objects encompassed by three-dimensional object 410 will automatically form a subset of graphical objects.

Simultaneously, upon the creation of the subset of graphical objects at user interface 305 (i.e. upon formation of three-dimensional object 410), a risk analysis and threat assessment module contained within the device (e.g. module 215) will be triggered to compute a risk score for the incidents contained within the subset of graphical objects. This computed risk score is then displayed on user interface 305 as risk score 405.

In embodiments of the invention, the risk score for each incident (that is represented by a graphical object) may be computed in the following manner. A risk and threat assessment module will first retrieve a list of computer assets associated with the computer network. Each of the computer assets would have a pre-assigned severity weightage value. Typically, a computer asset that is critical in the day-to-day running of the computer network, i.e. a valuable asset, would be accorded a larger severity weightage value as compared to a lesser valuable asset which would have been accorded a relatively lower severity weightage value. In embodiments of the invention, the severity weightage values may range between 0-10 with 10 being the largest severity weightage value that may be assigned to a computer asset while 0 is the lowest severity weightage value that may be assigned to a computer asset. One skilled in the art will recognize that numerical values with varying severity weightage ranges, e.g. 0-100, 50-100, etc., may be utilized without departing from this invention and is left as a design choice to a person skilled in the art.

The risk and threat assessment module would then corroborate the retrieved list of computer assets against each incident contained within object 410 to determine severity weightage scores of each incident. If a computer asset is affected by the incident, the severity weightage value of the incident will be utilized in the generation of the overall severity weightage score of that incident. In embodiments of the invention, the severity weightage score of an incident may be calculated using the following formula:

$$Incident_{Score} = \frac{\Sigma \text{ Weightage of Affected Assets}}{\text{Total Weightage of Assets}} \quad (1)$$

whereby "$Incident_{score}$" is the total severity weightage score of an incident and "Weightage of Affected Assets" is the weightage severity value of the assets affected by the incident. The total risk score for the incidents contained in object 410 may then be calculated using the following formula:

$$\text{Risk Score} = \frac{\Sigma \text{ Incident Scores}}{\text{Total Number of Assets}} \times 100\% \quad (2)$$

The formulas above are best explained with the following example. In the exemplary embodiment illustrated in FIG. 4, it is assumed that the assessment module has retrieved the computer network's list of assets together with their respective pre-assigned severity weightage values. In this example, it is shown that the computer network comprises computer assets 460 (i.e. A1-A7) which have each been pre-assigned with their respective severity weightage values 465 (i.e. "3", "9", "5", "1", "2" respectively). These assets have been pre-assigned with values between 0-10 with the value "10" being accorded to the asset that is the most important or valuable in the computer network.

The assessment module will begin the incident score calculation process by selecting the first incident contained in object 410 (i.e. a selection is made from incidents 465, e.g. I1, I2, I5, I6, and I7) which is graphical object I1. As all the information about each incident is stored within each incident record, i.e. information about I1 is contained within I1 itself, features affected by incident I1 may be obtained from the corresponding incident record itself. The selected object I1 is then compared with the list of assets in assets 460 and assuming that it is determined that I1 affects assets A1(3), A5(5) and A6(2), the severity weightage score for incident I1 is then calculated using formula (1). The Incident Score is then obtained as "(10/20)=0.5". The determination step of the incident score calculation process may be carried out in the assessment module whereby the assessment module identifies assets which have features that are affected by incident I1. For example, if the record of incident I1 indicates that I1 affects Windows operating systems through HTTP or FTP protocols, only assets running Windows operating system and HTTP or FTP protocols will be affected by incident I1. Assets that do not run such configurations will not be affected by incident I1.

Returning to the example, this process is then repeated for the other remaining incidents, i.e. I2, I5, I6 and I7. Assuming that the incident scores are obtained as follows: I2 has an incident score of 0.1, I5 has an incident score of 0.45, I6 has an incident score of 0.15 and I7 has an incident score of 0.30, the risk score for the objects contained in object 410 may then be obtained using formula (2) above. The Risk Score is then obtained as "[(0.5+0.1+0.45+0.15+0.3)/5]× 100%=30%". Risk score 405 will then display the obtained value of 30% on user interface 305. It should be noted that all these calculations take place in the assessment module and is not displayed on user interface 305. The only result that is displayed to a user of user interface 305 is risk score 405.

From the displayed risk score, the user is then able to determine whether mitigation actions are to be carried out to address the incidents contained in object 410. In this example, as the obtained risk score is only 30%, a user would not typically initiate any mitigation actions against these incidents. The user will then proceed to select the next subset of incidents and the process described above repeats itself until the user obtains a risk score value that alarms them, e.g. a risk score value>80%.

In another embodiment of the invention, when user interface 305 determines from the graphical object management module (e.g. module 210) that the graphical objects may no longer be rendered as a two-dimensional arrangement on a single screen on display 310, user interface 305 will cause the graphical objects to be rendered as a three-dimensional arrangement instead of a two-dimensional arrangement. Such a three-dimensional arrangement is displayed as three-dimensional arrangement 500 in FIG. 5a. Three-dimensional arrangement 500 comprises of three planes. These are plane 501 which comprises of a two-dimensional arrangement of graphical objects, plane 502 which comprises of another two-dimensional arrangement of graphical objects and plane 503 which comprises of yet another two-dimensional arrangement of graphical objects. These three planes are all combined together to form three-dimensional arrangement 500. One skilled in the art will recognize that any number of planes may be utilized without departing from the invention. It should also be noted that each plane may include any number of graphical objects as long as all the graphical objects may be simultaneously displayed on a single screen on display 310. The graphical objects in arrangement 500 are also displayed as semi-translucent objects instead of solid graphical objects. This ensures that objects in the rear planes, i.e. planes 502 and 503, may be easily viewed by a user of user interface 305 and not be blocked by graphical objects provided on the plane that is furthest in front, i.e. plane 501.

At this stage, it is useful to recap that in an embodiment of the invention, each graphical object displayed on user interface 305 represents an incident from an event monitoring system's TIF records. As time passes, the number of incidents stored in the TIF records will increase accordingly. In order to provide a user with a holistic overview of the incidents that may be affecting the computer network over a period of time, T, the graphical object management module in the computer system may pre-process the stored incidents by clustering the incidents together according to incident types. The object management module will first gather all the incidents that occurred with a time period T. One skilled in the art will recognize that T may comprise of any time periods such as, but are not limited to, any number of days, months or years and is left as a design choice to a person skilled in the art. The management module will then group or cluster the incidents together according to incident types. Once this is done, the management module will then display each of these incident types as graphical objects on the user interface.

In embodiments of the invention, the graphical objects displayed in the two-dimensional arrangement in FIG. 3 and the three-dimensional arrangement in FIG. 5 may be processed using the pre-processing method described above whereby instead of representing each single incident record as a graphical object, each displayed graphical object represents a cluster of incident types. In embodiments of the invention, in a three-dimensional arrangement such as arrangement 500, the incident clusters may be displayed in a hierarchical manner whereby incident clusters having the highest number of clusters may be displayed at a plane nearest to a user of user interface 305, i.e. plane 501, while incident clusters having a lower number of clusters may be displayed at a plane, i.e. plane 502, behind the first plane and so on. By doing so, the system is able to draw to the user's attention incident clusters that contain the frequently occurring incidents. The user may then obtain the risk scores for the selected groups of graphical objects by selectively grouping the displayed graphical objects together as required. The user is then able to obtain a general overview of the threats instigated by the various groupings of incident types across a period T.

In yet another embodiment of the invention, in order to provide a user with a real-time snapshot view of incidents that may be affecting the computer network over a shorter period, N, the graphical object management module in the computer system may pre-process the stored incidents by only selecting incidents that occurred between $t=0-N$ and $t=0$. It should be noted that the period, N, is typically much shorter than the period, T, and the period of N is left as a design choice to a person skilled in the art. The graphical object management module will then cluster the selected incidents into time intervals of $t_0, t_{0-1}, t_{0-2} \ldots t_{0-N}$ whereby each time interval represents an instance in time. For the avoidance of doubt, a time interval of $t_{0-2}$ takes place before $t_{0-1}$; a time interval of $t_{0-1}$ takes place before $t_0$ and so on. Each incident is then each displayed as a graphical object on user interface 305 whereby incidents clustered together (i.e. having the same time interval) are all plotted on the same plane along the z-axis.

Figure 5B:
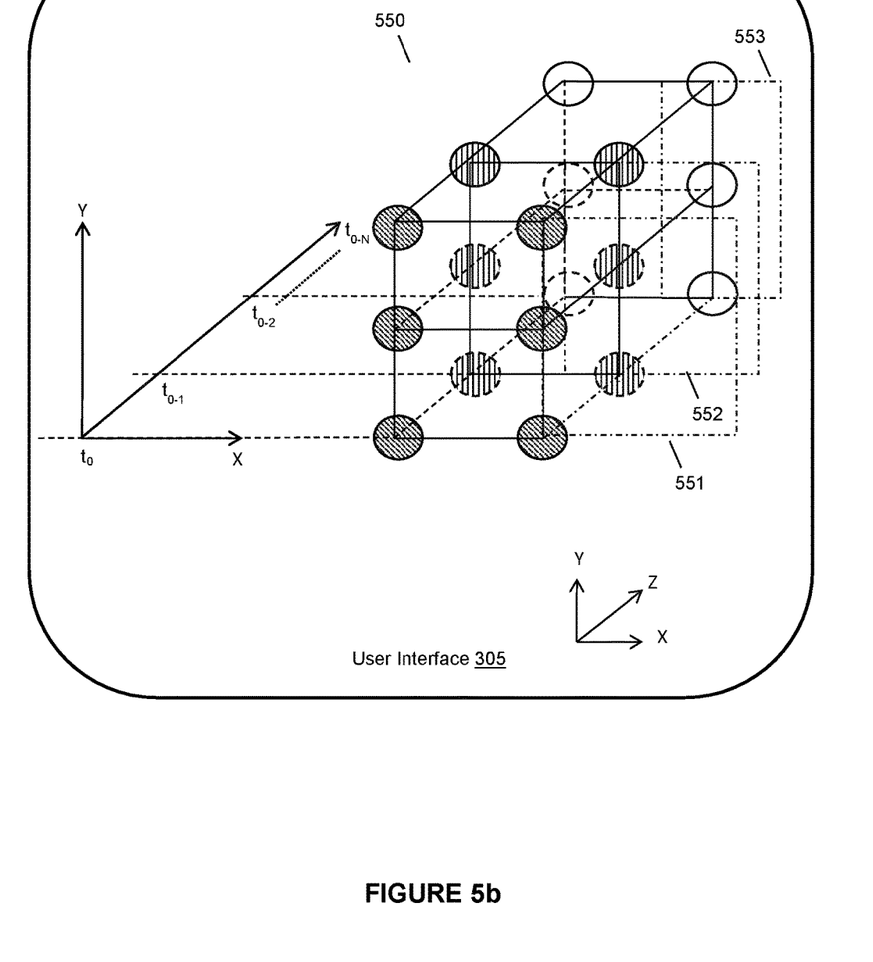
FIG. 5b illustrating an exemplary device displaying a user interface in accordance with embodiments of the invention whereby the user interface is displaying graphical objects in a three-dimensional arrangement on the display whereby the z-axis represents a time domain axis.

Such an embodiment is illustrated in FIG. 5b whereby three-dimensional arrangement 550 comprises graphical objects (each representing an incident) that have been pre-processed to provide a user with a snapshot view of incidents that occur between the period: t=0–N and t=0. In arrangement 550, incidents occurring at the time interval $t_0$ are all plotted as graphical objects on plane 551; incidents occurring at the time interval $t_{0-1}$ are all plotted as graphical objects on plane 552; and incidents occurring at the time interval $t_{0-2}$ are all plotted as graphical objects on plane 553. In summary, in arrangement 550, the most recent incidents are plotted as graphical objects on plane 551 which is provided at the front of arrangement 550; while incidents that occurred longer ago are plotted on the corresponding planes behind plane 551. Although arrangement 550 only illustrates three planes, i.e. planes 551, 552, and 553, one skilled in the art will recognize that the number of planes plotted on arrangement 550 will correspond to the number of time instances, up to the $t=t_{0-N}$ time instance, i.e. N planes. Such an arrangement is useful because it provides the user with insight into the occurrence of incidents across multiple time intervals.

For the embodiments illustrated in FIGS. 5a and 5b, graphical objects provided on a plane nearest to a user of user interface 305, i.e. planes 501 or 551 respectively, may be selected by applying a first pressure level (using a finger or a pointer) onto the graphical object that is to be selected while graphical objects provided on a plane behind this plane, i.e. planes 502 or 552 respectively, may be selected by applying a second pressure level. A touch controller module (e.g. module 205) provided within the system will determine whether the detected pressure level falls within a first pressure level or a second pressure level. This may be done by setting upper and lower pressure boundaries to demarcate the respective pressure levels. Simultaneously, the graphical object management module (e.g. module 210) will determine whether a graphical object is provided at the location where the pressure level is detected. If the graphical object management module determines that a graphical object is present at the particular location where the relevant pressure level is measured, the module will cause that particular graphical object to be selected. Similarly, graphical objects provided on plane 503 or 553 may be selected by applying a third pressure level. One skilled in the art will recognize that graphical objects provided on other planes (e.g. a fourth pressure level to select an object on a fourth plane) may be selected in the same manner.

Figure 6:
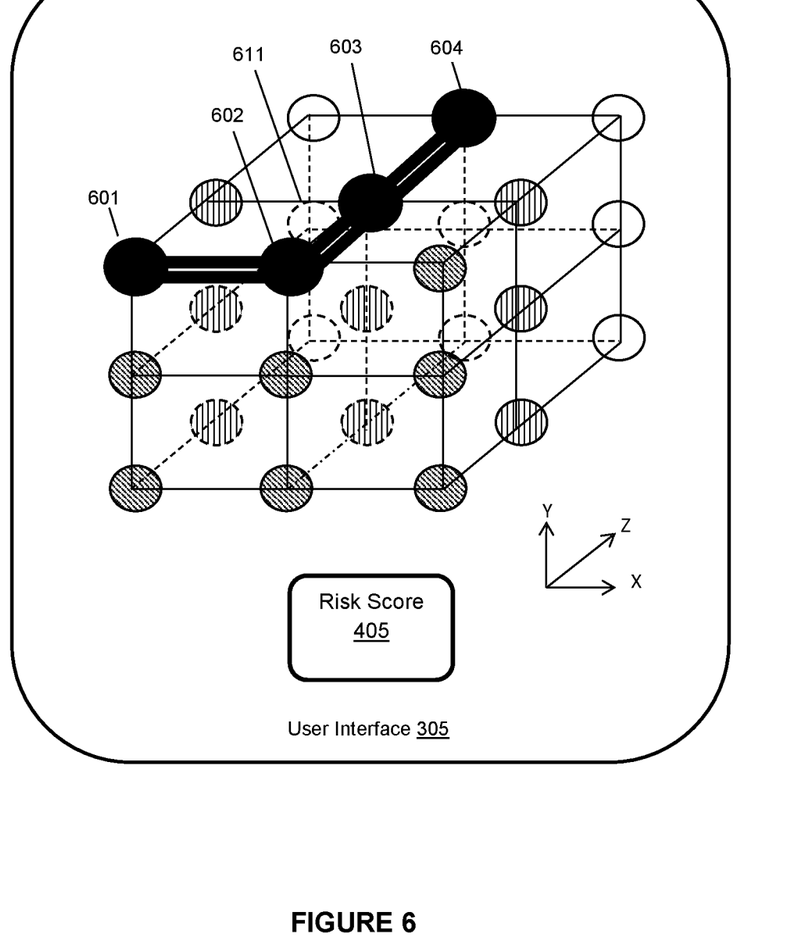
FIG. 6 illustrating an exemplary device displaying a user interface in accordance with embodiments of the invention whereby a subset of graphical objects from a three-dimensional arrangement of graphical objects have been selected using a continuous touch input and a risk score has been generated and displayed for the selected subset of graphical objects.

FIG. 6 illustrates an example of this embodiment of the invention whereby a subset of graphical objects in three-dimensional arrangement 500 are selected using the method described above. A person skilled in the art will recognize that this example may be applied to arrangement 550 as described in FIG. 5b as well. In this example, graphical objects 601, 602, 603 and 604 are the graphical objects that are to be selected to form the subset of graphical objects. At a first instance in time, a first pressure level is applied to object 601. This first pressure level is detected by user interface 305 and as such, object 601 is added to a subset of graphical objects. In a continuous motion, without removing the pressure (e.g. finger or pointer) applied on user interface 305, the pressure is continuously applied along the x-axis towards object 602. User interface 305 then determines that a first pressure level in a continuous motion has been applied at object 602 as such; object 602 is also added to the subset of graphical objects.

At this stage, if the user wishes to obtain risk score 405 for only these two graphical objects, i.e. objects 601 and 602, or more specifically for the incidents represented by these objects, the user may then remove the pressure applied on user interface 305 by removing their finger or pointer. When the pressure is removed, the risk score is automatically calculated for just these two incidents and the risk score will be displayed to the user on user interface 305.

Alternatively, if the user wishes to add a further graphical object to the subset of graphical objects, the user will have to continuously select the next graphical object after selecting object 602. In the example shown in FIG. 6, the next object to be selected is object 603 which is located on a different plane from objects 601 and 602. In order to select object 603 which is provided at plane 502, as part of the previous continuous motion, without removing the pressure (e.g. finger or pointer) applied on user interface 305, the pressure is continuously applied along the z-axis towards object 603. Once a second pressure level is applied to object 603, user interface 305 will determine that as the second pressure level in a continuous motion has been applied at object 603, object 603 is to be added to the subset of graphical objects.

It should be noted that as the touch motion is applied between object 602 and object 603 in a single continuous line, the applied touch pressure would have passed through object 611. However, as object 611 would not have been selected as object 611 resides in plane 503. This means that object 611 may only be selected when a third pressure level is applied. This ensures that even though multiple planes are utilized in three-dimensional arrangement 500, a user may still accurately and quickly select the desired graphical object effortlessly.

The next object to be selected now after object 603 is object 604 which is located at a different plane from objects 601, 602 and 603. In order to select object 604 which is provided at plane 503, as part of the previous continuous motion, without removing the pressure (e.g. finger or pointer) applied on user interface 305, the pressure is continuously applied along the z-axis towards object 604 from object 603. Once a third pressure level is applied to object 604, user interface 305 will determine that as the third pressure level in a continuous motion has been applied at object 604, object 604 is also to be added to the subset of graphical objects.

As the user has completed the selection of the graphical objects that are to be added to the subset of graphical objects, the user may now stop applying the pressure to user interface 305. When this occurs, graphical objects 601, 602, 603 and 604 which have been selected will automatically form a subset of graphical objects.

Similarly, upon the creation of the subset of graphical objects at user interface 305, a risk analysis and threat assessment module contained within the device (e.g. module 215) will be triggered to compute a risk score for the incidents contained within the subset of graphical objects. This computed risk score is then displayed on user interface 305 as risk score 405.

If it is determined from risk score 405 that the incidents in the subset of graphical objects represent actual threats to the computer network, the risk and threat assessment module will then propose mitigation actions that may be executed to address the selected incidents. The list of proposed mitigation actions may be displayed on display 310. The user may then select the mitigation action that is to be executed by selecting the action with a swiping motion on user interface 305 or by applying a touch pressure onto the appropriate action such that user interface 305 recognizes that this action has been selected. It should be noted that the mitigation actions will only be executed in relation to incidents that are contained within the subset of graphical objects. For example, if a mitigation action involves sending an email to computer analysts for further action, the email will only contain information about the incidents contained within the subset of graphical objects. This means that the computer analysts will be provided with detailed information that allows them to target specific monitoring devices. Such information improves the analysts' response time as they would not be swamped with irrelevant data or false alerts.

In embodiments of the invention, a mitigation action may involve the transmission of a command to an intermediate intrusion detection or prevention system to mitigate the Internet Protocol address that triggered the cyber-security threat incident and at the same time, submit an incident notification ticket to a Security Information and Event Management (SIEM) system where possible. Information about the source IP that triggered the attack may be retrieved from the incident record.

In embodiments of the invention, a process is needed for evaluating and attending to cyber-security threat incidents that are represented as graphical objects on a touch screen display. The following description and FIG. 7 describes an embodiment of a process in accordance with this invention.

Figure 7:
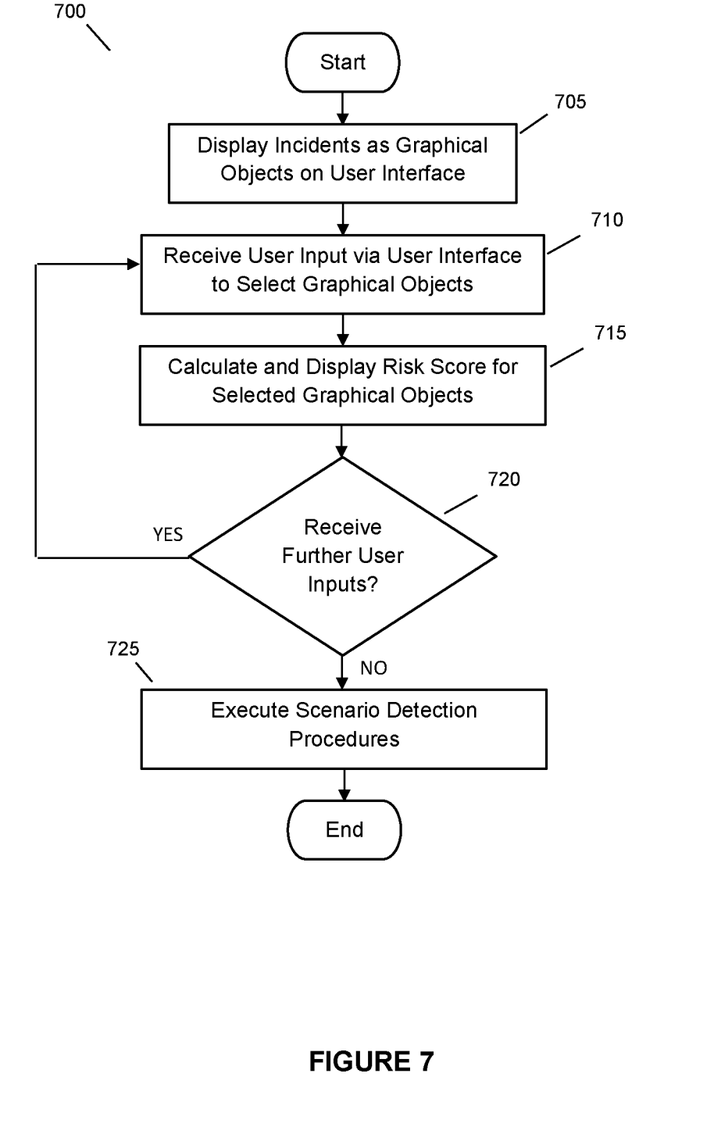
FIG. 7 illustrating a flow diagram of a process for evaluating threat incidents displayed on a display of a device in accordance with embodiments of the invention.

FIG. 7 illustrates process 700 that is performed by a computer system to allow a user to quickly evaluate cyber-security threat incidents that are represented as graphical objects on a display. The process then calculates a risk score for the selected threat incidents and proposes scenario detection procedures as mitigation actions.

Process 700 begins at step 705 whereby process 700 displays each incident contained within a TIF record as a graphical object on a user interface of a display. At this step, process 700 determines whether the graphical objects are to be displayed as a two-dimensional arrangement or as a three-dimensional arrangement. If all the graphical objects in the two-dimensional arrangement may be displayed on a single display screen, process 700 will select the two-dimensional arrangement. Alternatively, process 700 will select the three-dimensional arrangement for the graphical objects whereby the graphical objects are arranged as a plurality of planes.

Process 700 then proceeds to step 710 whereby process 700 receives a user input via the display's user interface to select graphical objects that are to form part of a subset of graphical objects. The user input may be in the form of a touch pressure on the display. Based on the graphical objects contained within the subset of graphical objects, or based on the incidents represented by this subset of graphical objects, process 700 then proceeds to calculate the risk score for the selected incidents. This takes place at step 715. Once the risk score has been calculated, process 700 then displays the risk score at step 715 as well.

At step 720, process 700 determines whether further user inputs are received to select a new subset of graphical objects to replace the previously selected subset. If process 700 determines that such a further user input has been received, process 700 returns to step 710 whereby process 700 proceeds to receive the further user input via the display's user interface to select graphical objects that are to form the new subset of graphical objects. Similarly, based on the graphical objects contained within the new subset of graphical objects, process 700 then proceeds to calculate the risk score for the selected incidents at step 715. Once the risk score has been calculated, process 700 then displays the risk score at step 715 as well.

Alternatively, if at step 720 process 700 determines that no further user inputs are received, process 700 then proceeds to execute scenario detection procedures at step 725 to address the incidents that are determined to be threats. The scenario detection procedures may comprise mitigation actions targeting the selected incidents such as sending an email to the relevant parties or disrupting the source of the attack.

The above is a description of embodiments of a system and process in accordance with the present invention as set forth in the following claims. It is envisioned that others may and will design alternatives that fall within the scope of the following claims.

The invention claimed is:

1. A method of evaluating cyber-security threat incidents of a computer network using a device, the method comprising:
   presenting graphical objects on a user interface of a display of the device, whereby each graphical object represents a cyber-security threat incident;
   receiving a single continuous touch input through a touch interface of the user interface, the continuous touch input selecting a subset of graphical objects;
   generating a risk score for the subset of graphical objects, whereby the risk score is generated by:
      retrieving a list of computer assets associated with the computer network and severity weightage values accorded to each of the computer assets, whereby for each graphical object, identifying computer assets that are affected by the threat incident represented by the graphical object and summing the severity weightage values of the identified computer assets, and dividing the summed severity weightage values by the sum of severity weightage values of all the assets to obtain an incident score for each graphical object, and
      calculating the risk score by dividing a sum of the incident scores of all the graphical objects in the subset of graphical objects by a total number of graphical objects in the subset of graphical objects and by multiplying the result with a 100;
   displaying the generated risk score on the display of the device; and
   executing mitigation actions for graphical objects in the subset of graphical objects if the generated risk score exceeds a confidence score.

2. The method according to claim 1 wherein the selecting the subset of graphical objects comprises:
   tracing, by the touch input, a continuous the graphical objects; and
   generating the subset of graphical objects from graphical objects contained within the three-dimensional pattern.

3. The method according to claim 1 wherein the selecting the subset of graphical objects comprises:
   tracing, by the touch input, a continuous three-dimensional pattern through graphical objects provided on a first plane and graphical objects provided on a second plane, whereby a graphical object on the first plane is selected by applying a first pressure value on the touch interface and a graphical object on the second plane is selected by applying a second pressure value on the touch interface; and generating the subset of graphical objects from graphical objects contained within the three-dimensional pattern.

4. The method according to claim 3 wherein the first pressure value comprises coordinates in x and y Cartesian coordinates and the second pressure value comprises coordinates in x, y and z Cartesian coordinates.

5. The method according to claim 1 wherein the selecting the subset of graphical objects comprises:
tracing, by the touch input, a continuous three-dimensional pattern through graphical objects provided on a first plane, graphical objects provided on a second plane and graphical objects provided on a third plane, whereby a graphical object on the first plane is selected by applying a first pressure value on the touch interface, a graphical object on the second plane is selected by applying a second pressure value on the touch interface and a graphical object on the third plane is selected by applying a third pressure value on the touch interface; and
generating the subset of graphical objects from graphical objects contained within the three-dimensional pattern.

6. The method according to claim 1 wherein the mitigation action comprises:
transmitting, by the device, a command to an intermediate intrusion detection system associated with the computer network, the command instructing the intrusion detection system to mitigate Internet Protocol (IP) addresses that triggered the cyber-security threat incidents in the subset of graphical objects.

7. The method according to claim 1 wherein the presenting the graphical objects on a user interface of the display of the device comprises:
selecting threat incidents that occurred within a time-frame;
clustering the selected threat incidents into groups, wherein each group represents a time instance of the time-frame and wherein each threat incident in each group is displayed as a graphical object; and
displaying each group of graphical objects as a plane along a z-axis of the user interface wherein each plane represents a time instance of the time-frame.

8. The system according to claim 7 wherein the mitigation actions comprises:
instructions for directing the processing unit to:
transmit, by the device, a command to an intermediate intrusion detection system associated with the computer network, the command instructing the intrusion detection system to mitigate Internet Protocol (IP) addresses that triggered the cyber-security threat incidents in the subset of graphical objects.

9. A system for evaluating cyber-security threat incidents of a computer network comprising:
a processing unit; and
a non-transitory media readable by the processing unit, the media storing instructions that when executed by the processing unit, cause the processing unit to:
present graphical objects on a user interface of a display of the device, whereby each graphical object represents a cyber-security threat incident;
receive a single continuous touch input through a touch interface of the user interface, the continuous touch input selecting a subset of graphical objects;
generate a risk score for the subset of graphical objects, whereby the risk score is generated by:
retrieving a list of computer assets associated with the computer network and severity weightage values accorded to each of the computer assets, whereby for each graphical object, to identify computer assets that are affected by the threat incident represented by the graphical object and to sum the severity weightage values of the identified computer assets, and to divide the summed severity weightage values by the sum of severity weightage values of all the assets to obtain the incident score for each graphical object, and
calculating the risk score by dividing a sum of the incident scores of all the graphical objects in the subset of graphical objects by a total number of graphical objects in the subset of graphical objects and by multiplying the result with a 100;
display the generated risk score on the display of the device; and
execute mitigation actions for graphical objects in the subset of graphical objects if the generated risk score exceeds a confidence score.

10. The system according to claim 9 wherein the instructions to select the subset of graphical objects comprises:
instructions for directing the processing unit to:
trace, by the touch input, a continuous boundary around the graphical objects; and
generate the subset of graphical objects from graphical objects encompassed by the boundary.

11. The system according to claim 9 wherein the instructions to select the subset of graphical objects comprises:
instructions for directing the processing unit to:
trace, by the touch input, a continuous three-dimensional pattern through graphical objects provided on a first plane and graphical objects provided on a second plane, whereby a graphical object on the first plane is selected by applying a first pressure value on the touch interface and a graphical object on the second plane is selected by applying a second pressure value on the touch interface; and
generate the subset of graphical objects from graphical objects contained within the three-dimensional pattern.

12. The system according to claim 9 wherein the instructions to select the subset of graphical objects comprises:
instructions for directing the processing unit to:
trace, by the touch input, a continuous three-dimensional pattern through graphical objects provided on a first plane, graphical objects provided on a second plane and graphical objects provided on a third plane, whereby a graphical object on the first plane is selected by applying a first pressure value on the touch interface, a graphical object on the second plane is selected by applying a second pressure value on the touch interface and a graphical object on the third plane is selected by applying a third pressure value on the touch interface; and
generate the subset of graphical objects from graphical objects contained within the three-dimensional pattern.

13. The system according to claim 12 wherein the first pressure value comprises coordinates in x and y Cartesian coordinates and the second pressure value comprises coordinates in x, y and z Cartesian coordinates.

14. The system according to claim 9 wherein the instructions to present the graphical objects on a user interface of the display of the device comprises:
instructions for directing the processing unit to:
select threat incidents that occurred within a time-frame;

cluster the selected threat incidents into groups, wherein each group represents a time instance of the time-frame and wherein each threat incident in each group is displayed as a graphical object; and display each group of graphical objects as a plane along a z-axis of the user interface wherein each plane represents a time instance of the time-frame.

* * * * *

UNITED STATES PATENT AND TRADEMARK OFFICE
CERTIFICATE OF CORRECTION

PATENT NO. : 10,237,297 B2  
APPLICATION NO. : 15/117151  
DATED : March 19, 2019  
INVENTOR(S) : Keng Leng Albert Lim Page 1 of 1

It is certified that error appears in the above-identified patent and that said Letters Patent is hereby corrected as shown below:

In the Claims

Column 14, Line 52 should read:
2. The method according to claim 1 wherein the selecting the subset of graphical objects comprises:
    tracing, by the touch input, a continuous boundary around the graphical objects; and
    generating the subset of graphical objects from graphical objects encompassed by the boundary.

Signed and Sealed this  
Tenth Day of November, 2020

Andrei Iancu  
*Director of the United States Patent and Trademark Office*